United States Patent [19]
Zebo

[11] 3,990,006
[45] Nov. 2, 1976

[54] DIGITAL TONE DETECTOR USING CONCATENATED DETECTION INTERVALS

[75] Inventor: Timothy James Zebo, Freehold, N.J.

[73] Assignee: Bell Telephone Laboratories, Incorporated, Murray Hill, N.J.

[22] Filed: Jan. 8, 1975

[21] Appl. No.: 539,414

[52] U.S. Cl. .............................. 324/78 D; 324/77 D
[51] Int. Cl.² ......................................... G01R 23/02
[58] Field of Search .................... 328/138, 140, 167; 307/233, 295; 324/78 D, 77 D, 186, 77 CS

[56] References Cited
UNITED STATES PATENTS

| | | | |
|---|---|---|---|
| 3,083,266 | 3/1963 | Mathews et al. .................. | 324/77 D |
| 3,566,263 | 2/1971 | Meers .............................. | 324/78 D |
| 3,696,293 | 10/1972 | Hoffmann ......................... | 324/78 D |
| 3,760,269 | 9/1973 | Beeman ........................... | 324/78 D |
| 3,790,720 | 2/1974 | Schartmann ...................... | 324/78 D |

Primary Examiner—Robert Segal
Assistant Examiner—Michael J. Tokar
Attorney, Agent, or Firm—Richard J. Roddy

[57] ABSTRACT

Known tone detectors are adversely affected by various signaling tone distorting sources, including noise as well as talk-off due to tone-like speech, e.g., due to averaging of speech frequencies over a detection interval. As a result, improper tone detection often occurs. This problem is mitigated by dividing a detection interval into a plurality of detection sub-intervals which are then concatenated for tone detection. Detection of the desired tone in at least a predetermined number of concatenated sub-intervals is interpreted as the presence of a valid tone. Conversely, absence of detection of the desired tone in at least a second predetermined number of concatenated sub-intervals is interpreted as the absence of a valid tone.

13 Claims, 4 Drawing Figures

DIGITAL TONE DETECTOR USING CONCATENATED DETECTION INTERVALS

FIELD OF THE INVENTION

This invention relates to tone detection and, more particularly, to a method and apparatus for detecting a signaling tone in a telecommunications sytstem.

BACKGROUND OF THE INVENTION

Signaling tones including one or more predetermined frequencies are used extensively throughout telecommunications systems. A familiar example is a call progress signaling tone, which is a supervisory signal generated in a telephone central office during the time interval between initiation of a telephone call and termination of the call. Typical call progress tones include audible ring, busy, and reorder. Although call progress tones are usually intended for aural recognition by the calling party, a business machine can be advantageously arranged to take appropriate actions if the machine is able to selectively detect and identify a tone. Accordingly, with the increasing use of digital transmission terminals, a need naturally arises for economical and reliable arrangements for tone detection in a digital environment.

Unfortunately, the signaling tone is often corrupted by various sources of noise. For example, low frequency inductive switching transients may distort boundaries of a pulse tone. Further, Gaussian, impulse, or 60-hertz noise may even mask the presence of low-level tones. Conversely, noise may mask the absence of a signaling tone. Furthermore, speech may imitate an inband signaling tone and thereby produce false signaling information. These unfortuitous aspects of tone detection are even more aggravated by the current absence of a more quantitative description of the various noise sources.

Existing analog tone detectors avoid some of these problems by using bandpass or band elimination filters to first separate signals from noise sources in the frequency domain. The analog filters are usually coupled with an energy detector and comparator, the outputs of which are advantageously arranged to determine whether a tone signal is present. The extensive use of the frequency domain for analog detection is based in part on the advanced state, and consequently the low cost, of analog filter technology. By way of contrast, however, digital filters are typically substantially more expensive. As a result, the frequency domain approach to digital tone detection in a large telecommunications system is economically restrained.

DESCRIPTION OF THE PRIOR ART

An alternative approach is a digital tone detector operable in the time domain. One such detector is disclosed in U.S. Pat. No. 3,845,399 issued to C. D. Cardon et al. on Oct. 29, 1974. Therein a special purpose digital filter establishes a fixed sample time, or detection interval, during which the actual number of cycles or zero crossings of a sampled signal are counted. The cycle count during the detection interval is then compared to a mimimum number and to a maximum number of cycles, which define a bandpass range of the filter. If within the range, indicating the presence of the desired frequency signal, a True signal is generated; and if without the range, a False signal is generated.

Although the Cardon detector determines the actual number of pulses in one detection interval, the number counted may be influenced by interfering effects such as that caused by noise. Accordingly, it is advantageous to design a digital tone detector to operate responsive to a plurality of detection intervals rather than to one such interval.

A time measuring system, which improves the accuracy of digital counting in the presence of noise, is disclosed in U.S. Pat. No. 2,829,342 issued to K. W. Pfleger on Apr. 1, 1958. Pfleger sums up the counts during a succession of recurrent, substantially equal detection intervals to obtain an average value for a single interval. A control system automatically stops the counting when a desired number of intervals has occurred. The control system includes a noise indicator which is useful to determine how many intervals should be counted in order that the average count per interval may be determined with a desired degree of accuracy. The accuracy of the Pfleger system improves as the square root of the number of detection intervals increases. However, as the number of intervals increases, a prolonged delay is introduced in selectively detecting a signaling tone. Consequently, it would be desirable to provide a digital tone detector in which the detection delay is reduced consistent with a desired accuracy for signaling tone detection in the presence of noise.

SUMMARY OF THE INVENTION

In accordance with the principles of the invention, the prior art difficulties are mitigated in an illustrative embodiment of a method and apparatus for determining the presence or absence of a particular signaling tone or frequency signal. In one aspect of the invention, a sequence of detection intervals is defined and the detection of the particular frequency in each of a first predetermined number of the detection intervals determines the presence of the particular frequency signal.

According to a further aspect of the invention, the failure to detect the particular frequency in each of a second predetermined number of the detection intervals, prior to detection of the particular frequency in the first predetermined number of intervals, determines the absence of the particular frequency signal.

A still further aspect of the invention relates to defining a plurality of sequences of detection intervals, each sequence having a different length detection interval. Detection of the particular frequency in a first predetermined combination of the various different length detection intervals indicates the presence of the particular frequency signal. Failure to detect the particular frequency in a second predetermined combination of the detection intervals indicates the absence of the particular frequency signal.

BRIEF DESCRIPTION OF THE DRAWING

These and other aspects of the invention should become fully apparent when taken in connection with the following detailed description and the accompanying drawing in which.

DETAILED DESCRIPTION OF THE INVENTION

Figure 1:
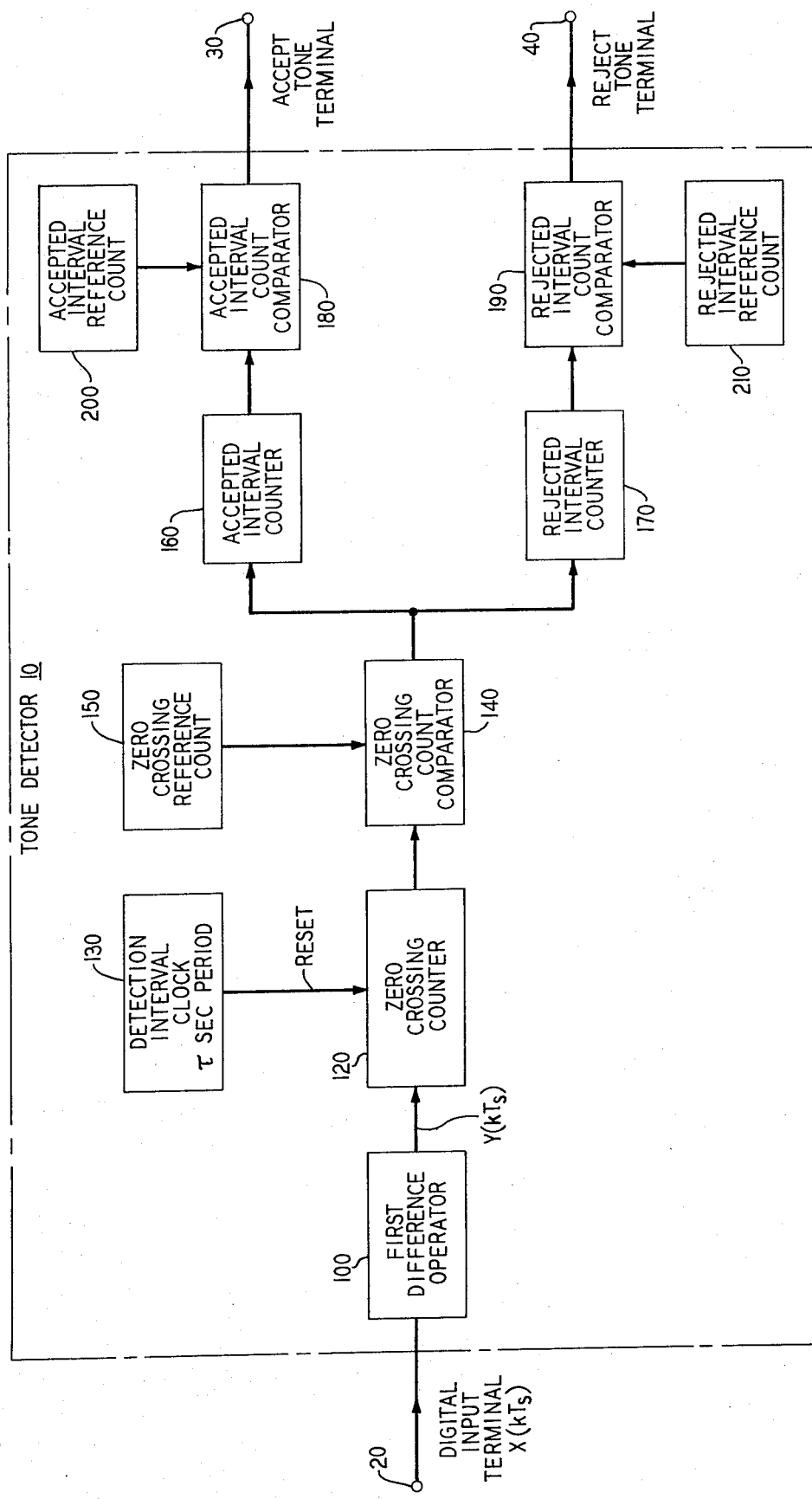
FIG. 1 depicts an illustrative block diagram schematic for digital tone detection in accordance with the principles of the present invention.

Broadly, in FIG. 1, a signaling tone $X(kT_S)$, illustratively a sinusoidal signal, is applied to tone detector 10 through digital input terminal 20 to an input of First Difference Operator 100. An output $Y(kT_S)$ of Operator 100 is the mathematical first difference of signaling tone $X(kT_S)$. The signal $Y(kT_S)$ is applied to an input of Zero Crossing Counter 120. Zero Crossing Counter 120 is incremented once for each algebraic sign change of $Y(kT_S)$. Crossing Counter 120 is reset responsive to a reset signal provided on lead RESET by Detection Interval Clock 130. The reset signal is provided once each detection interval $\tau$. Responsive to the count provided by Zero Crossing Counter 120, Zero Crossing Count Comparator 140 determines if the number of zero crossings matches a predetermined reference count provided by Zero Crossing Reference Count 150.

If a match occurs, the detection interval is said to be accepted. Accepted Interval Counter 160 is then incremented by one. On the other hand, if a match does not occur, i.e., a mismatch is found, the interval is said to be rejected, and Rejected Interval Counter 170 is incremented by one. Interval counters 160 and 170 are examined and reset, if necessary, by Accepted Interval Count Comparator 180 and Rejected Interval Count Comparator 190, respectively. If the number of accepted intervals matches a predetermined reference provided by Accepted Interval Reference Count 200 before a predetermined number of detection intervals, corresponding to a second predetermined reference provided by Rejected Interval Reference Count 210, are rejected, the input is assumed to be a valid signal tone. An accept tone signal is then provided at Accept Tone Terminal 30. Otherwise, if the second reference is attained first, a reject tone signal is provided at Reject Tone Terminal 40.

More particularly, and yet illustratively, assume a digital sampled signaling tone of the form $X(kT_S) = A \sin(2\pi f k T_S)$ where A is the amplitude and $f$ is a frequency of the signaling tone; $k$ is an arbitrary integer; and $T_S$ is the time between sampling pulses. Sampling pulse time $T_S$ equals the reciprocal sampling frequency $f_s$. Responsive to the assumed tone, first difference $Y(kT_S) = B \sin(2\pi f k T_S + \theta)$ where $B = 2A \sin(\pi f/f_s)$ and $\theta = -\pi f T_S - \pi/2$. Accordingly, output $Y(kT_S)$ of First Difference Operator 100, provided to Zero Crossing Counter 120, is a known signal, decreasing monotonically with decreasing values of input frequency $f$ as long as input frequency $f$ does not exceed one-half the sampling frequency. First Difference Operator 100 thus functions as a digital high-pass filter.

To simplify the subsequent discussion, the input signal to Zero Crossing Counter 120 will be assumed to be a pure sinusoidal signal given by $Y(kT_S) = A \sin(2\pi f k T_S + \theta)$ where $0 \le kT_s \le \tau$ and $0 \le \theta \le \pi$, the symbols being as previously defined. In addition, $\theta$ is defined as the phase angle between the start of a $\tau$-second detection interval and the first zone crossing of $Y(KT_S)$ preceding the start. Since interval $\tau$ may begin anywhere relative to the signal $Y(kT_S)$, $\theta$ is a random variable describable by a well-known uniform density function, uniform between zero and $\pi$ radians. Furthermore, as will become clear, the principles of the invention are applicable to a plurality of types of tone detectors, e.g., a low-frequency passband detector, a high-frequency passband detector, a single-frequency detector, and a bandpass detector. So, for conciseness, the following discussion of the principles of the invention is made in reference to an illustrative bandpass detector.

Figure 2A:
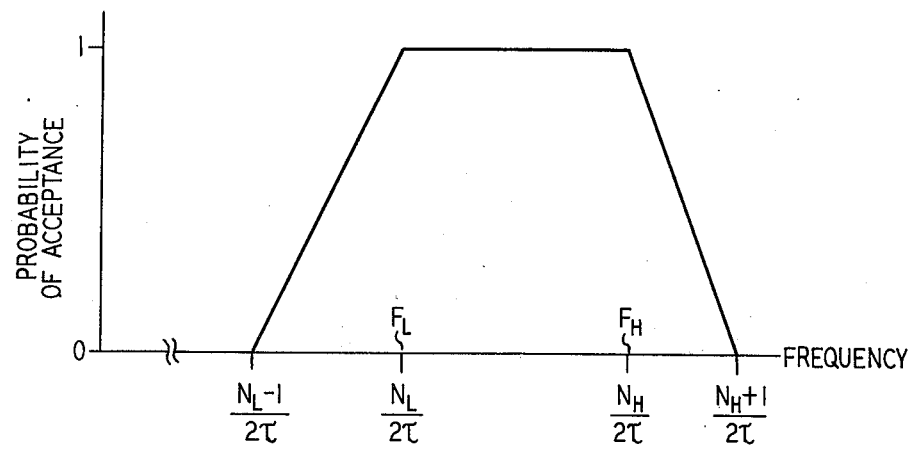
FIG. 2A illustrates a typical prior art digital tone detector bandpass frequency range.

A bandpass detector is one in which the $\tau$-second detection interval is accepted if a detected frequency $f$ of the input signal tone lies within a predetermined frequency range, e.g., $F_L \le f \le F_H$. The predetermined range is called the tone acceptance frequency range with $F_L$ and $F_H$ being, respectively, the low and high break frequencies. These boundaries, or break frequencies, are rational fractional multiples of sampling frequency $f_s$, the sampling frequency being a parameter typically determined by other system requirements. There is, of course, a one-to-one correspondence with the tone acceptance range and a set of zero crossing counts. In order to ascertain the tone acceptance frequency range, it will be useful to define $N_L$ as the lowest zero crossing count for acceptance and $N_H$ as the highest zero crossing count for acceptance. That is, a signaling tone will be accepted if it contains any number of zero crossings between and including $N_L$ and $N_H$. FIG. 2A illustrates a typical prior art tone acceptance frequency range.

It is clear that one zero crossing of the input signal to Crossing Counter 120 will always occur within an interval $\pi$ radians long. Similarly, two crossings will be found within an interval $2\pi$ radians long. Or, in general, N zero crossings will occur within an interval $N\pi$ radians long, where N is an arbitrary integer. Therefore, if, during a $\tau$-second detection interval, $Y(kT_S)$ includes no more than $N_H$ zero crossings, then the interval length in radians, when added to $\theta$, must be less than $(H_H + 1) \pi$ radians. Similarly, if, during a $\tau$-second interval, $Y(kT_S)$ includes at least $N_L$ zero crossings, then the interval length must be at least $N_L \pi$ radians. Accordingly, zero crossing boundaries, corresponding to break frequencies, may be established as $N_L \pi < (2\pi f\tau + \theta) < (N_H + 1)\pi$.

From the crossing boundaries, coupled with the random variable $\theta$ being a uniform distribution between zero and $\pi$ radians, the probability of acceptance is determined in a straightforward manner. The probability of acceptance means the probability that a detected signaling tone will be assumed by tone detector 10 to have a frequency within the tone acceptance frequency range. Here the prior art probability of acceptance, based on a single detection interval, is given by the following mathematical representation, which is graphically illustrarted in FIG. 2A:

$$\text{Probability of acceptance} = \begin{cases} 0; & 0 \le f \le \frac{N_L - 1}{2\tau} \\ 1 + 2\tau\left[f - \frac{N_L}{2\tau}\right]; & \frac{N_L - 1}{2\tau} \le f \le \frac{N_L}{2\tau} \\ 1; & \frac{N_L}{2\tau} \le f \le \frac{N_H}{2\tau} \\ 1 - 2\tau\left[f - \frac{N_H}{2\tau}\right]; & \frac{N_H}{2\tau} \le f \le \frac{N_H + 1}{2\tau} \\ 0; & \frac{N_H + 1}{2\tau} \le f \end{cases} \quad (1)$$

Frequencies for which the probability of acceptance is neither unity nor zero are said to be phase dependent. That is, an uncertainty of acceptance is posited when the frequency is phase dependent, the uncertainty stemming from the effect of random variable phase angle $\theta$.

As aforementioned, tone detection, in accordance with the illustrative embodiment in FIG. 1, depends upon Accepted Interval Counter 160 matching a reference count provided by Accepted Interval Reference Count 200, before a predetermined number of rejected intervals has been counted by Rejected Interval Counter 170. There are several reasons for including Counters 160 and 170 which may not be immediately apparent. For example, the probability of accepting a signaling tone in the phase dependent frequency range is inversely proportional to the detection interval length.

Thus, on the one hand, to increase the probability that an unwanted signaling tone will be rejected, the detection interval should be made as long as possible. However, as the detection interval is increased, so also is the probability of improper tone detector operation, caused, in part, by unfortuitous noise appearing at input terminal 20. Also, random noise within a single long interval may delay the detection of a valid signal by causing the signal to be rejected. Moreover, if the input signal is a tone pulse of minimum duration, the pulse may be missed entirely. In turn, the probability that a tone-like speech signal might be accepted as a signaling tone is increased. Accordingly, increasing the detection interval decreases the sensitivity of the detector to short tone frequency variations.

On the other hand, as the detection interval is decreased, the width of an uncertain rejection region is correspondingly increased. As a result, the detector is more likely to accept unwanted tones or speech as a valid tone signal.

Accordingly, Accepted Interval Counter 160 and Rejected Interval Counter 170 are advantageously employed to effect a compromise between the above opposing requirements upon the length of the detection interval. The length of the detection interval is chosen to be of minimum duration consistent with the phase independent tone acceptance frequency range matching the range of signaling tone for which tone acceptance must be assured. This strategy provides reasonably short delays in recognizing the start and stop of a tone pulse.

Accepted Interval Counter 160 further decreases the width of the tone acceptance frequency range for which acceptance is phase dependent. This advantageous result is accomplished according to an aspect of the invention wherein a plurality of accepted detection intervals are concatenated before a signaling tone is accepted as within the tone acceptance frequency range. For example, substantial improvement is provided in the probability of accepting a valid tone if a predetermined number M of $\tau$-second detection intervals has first been accepted. In the illustrative bandpass detector, each of the detection intervals may contain any number of zero crossings between and including $N_L$ and $N_H$. Thus the total number of zero crossings observed lies between and includes $MN_L$ and $MN_H$, i.e., the mathematical product. Accordingly, the corresponding probability of tone acceptance is given by the following mathematical representation, which is illustrated in FIG. 2B:

$$\text{Probability of acceptance} = \begin{cases} 0; & 0 \leq f \leq \frac{N_L - \frac{1}{M}}{2\tau} \\ 1 + 2M\tau\left[f - \frac{N_L}{2\tau}\right]; & \frac{N_L - \frac{1}{M}}{2\tau} \leq f \leq \frac{N_L}{2\tau} \\ 1; & \frac{N_L}{2\tau} \leq f \leq \frac{N_H}{2\tau} \\ 1 - 2M\tau\left[f - \frac{N_H}{2\tau}\right]; & \frac{N_H}{2\tau} \leq f \leq \frac{N_H + \frac{1}{M}}{2\tau} \\ 0; & \frac{N_H + \frac{1}{M}}{2\tau} \leq f. \end{cases} \quad (2)$$

Figure 2B:
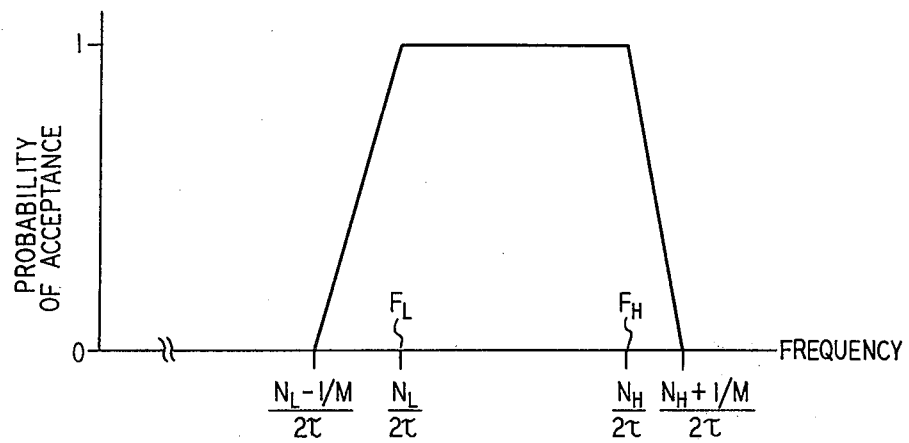
FIG. 2B illustrates an improved bandpass frequency range in accord with the principles of the invention.

Thereby, in accordance with the mentioned aspect of the invention, evidenced by comparing FIGS. 2A and 2B, concatenating M detection intervals advantageously reduces the phase dependent frequency range by a factor equal to the reciprocal of the number of concatenated intervals, i.e., (1M.) Fortuitously, frequencies accepted independently of the starting phase remain unchanged, while those rejected increase. Thus, the strategy provides the frequency selectivity of a single interval of length $M\tau$ but without the aforementioned disadvantages.

According to a second aspect of the invention, Rejected Interval Counter 170 advantageously serves to prevent false rejection of a tone which has been corrupted by noise at usually infrequent intervals. The input noise characteristics are employed to ascertain a predetermined number of rejected intervals which are permissible before a reject tone signal is provided at Terminal 40. Thereby tone detection is substantially improved in the presence of noise.

To more specifically illustrate the principles of the invention, a particular example is now described. Assume a digital single frequency receiver with a bandpass center frequency of 2600 hertz and a desired tone acceptance frequency range on the order of $2590 \leq f \leq 2610$. Since the sampling frequency is typically determined by other requirements, the break frequencies become fixed functions of the detection interval and number of zero crossings $N_L$ and $N_H$. If a detection interval of $\tau = 2.125$ milliseconds is assumed, a count of $N_L = 11$ corresponds to a rational break frequency of about 2588 hertz; whereas a count of $N_H = 12$ corresponds to a break frequency of about 2824 hertz. Accordingly, the illustrative single frequency receiver becomes a bandpass tone detector with $N_L = 11$ and $N_H = 12$ and with a probability of acceptance according to (1) above, in part given as:

$$\text{Probability of acceptance} = \begin{bmatrix} 1; & 2588 \leq f \leq 2824 \\ 0; & 3059 \leq f \leq 2353 \end{bmatrix}$$

Illustratively, in accord with the first-described aspect of the invention substantial improvement in tone detection can be attained if tone acceptance is conditioned on accepting a plurality of M of concatenated 2.125-millisecond intervals. Thus, assuming $M = 14$, for example, the probability of acceptance according to (2) above is:

$$\text{Probability of acceptance} = \begin{bmatrix} 1; & 2588 \leq f \leq 2824 \\ 0; & 2840 \leq f \leq 2571 \end{bmatrix}$$

Figure 3:
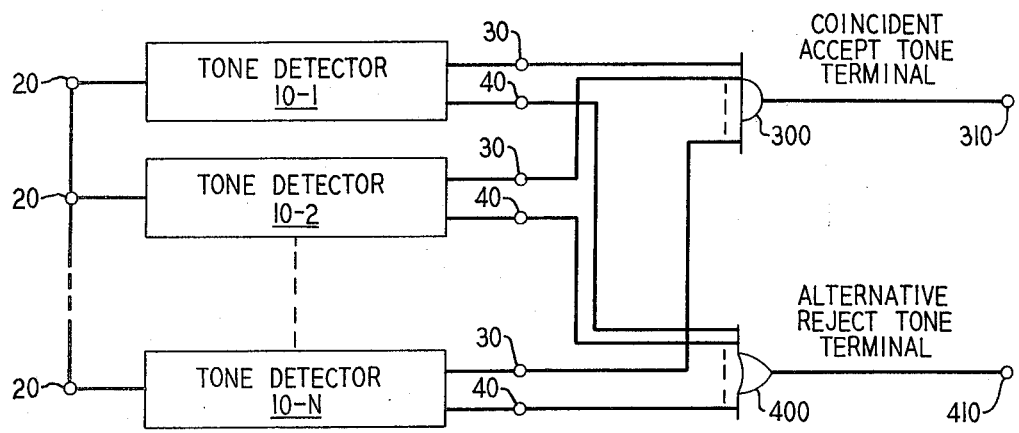
FIG. 3 illustrates an arrangement of a plurality of the tone detectors of FIG. 1 in accord with an aspect of the invention.

A third aspect of the invention, as illustrated in FIG. 3, relates to combining a plurality of tone detectors 10, identified there as 10-1 through 10-N, with each digital input terminal 20 jointly connected so that an input signal is received by all N detectors. The Accept Tone Terminal 30 of each tone detector is connected to an input of AND-gate 300. The Reject Tone Terminal 40 of each detector is connected to an input of OR-gate 400. An output of AND-gate 300 is provided at Coincident Accept Tone Terminal 310 and, of OR-gate 400, at Alternative Reject Tone Terminal 410. Thereby still further improvement in tone detection can be attained if tone acceptance is conditioned on detection of the tone in a predetermined combination of different detection interval lengths.

To illustrate the third aspect of the invention, assume two tone detectors 10-1 and 10-2 are arranged as in FIG. 3 for use in a 2600 hertz single frequency receiver. Again, assume detector 10-1 has the aforementioned illustrative parameters, i.e., $\tau = 2.125$ milliseconds, $M = 14$, $N_L = 11$, and $N_H = 12$. If tone detector 10-2 is assumed to have a detection interval $\tau = 3.250$ milliseconds, then a count $N_L = 16$ corresponds to a second lower break frequency $F_L = 2462$ hertz; whereas a count $N_H = 17$ corresponds to a second high break frequency $F_H = 2615$ hertz. Thus, assuming a single detection interval, the illustrative tone detector 10-2 has a probability of acceptance according to (1) above of:

$$\text{Probability of acceptance} = \begin{bmatrix} 1; & 2462 \leq f \leq 2615 \\ 0; & 2769 \leq f \leq 2308 \end{bmatrix}$$

Tone detection by detector 10-2 is substantially improved by conditioning tone acceptance upon detection of, for example, nine concatenated 3.250-millisecond intervals so that the probability of acceptance according to (2) above is:

$$\text{Probability of acceptance} = \begin{bmatrix} 1; & 2462 \leq f \leq 2615 \\ 0; & 2632 \leq f \leq 2444 \end{bmatrix}$$

Still further improvement in tone detection can be attained according to the arrangement in FIG. 3, illustrating the third aspect of the invention, if tone acceptance is conditioned on detection of both 14 concatenated 2.125-millisecond intervals and nine concatenated 3.250-millisecond intervals. Then the bandpass break frequencies and the probability of acceptance are given as:

$$\text{Probability of acceptance} = \begin{bmatrix} 1; & 2588 \leq f \leq 2615 \\ 0; & 2632 \leq f \leq 2571 \end{bmatrix}$$

Although the invention has been described in detail with respect to a bandpass tone detection arrangement and illustrated with respect to a single frequency passband detector, it is to be understood that the same is not by way of limitation. For example, the principles of my invention apply equally to tone detectors for a low-frequency pass, high-frequency pass, or frequency band-rejection. The spirit and scope of my invention are limited only by the terms of the appended claims.

I claim:
1. A tone detector comprising:
means for defining a sequence of substantially equal detection intervals,
means operable during each detection interval for detecting an input signal of predetermined frequency, and
means for providing an output indication in response to the detection of said predetermined frequency signal during each of at least a predetermined plurality of said detection intervals within said sequence, said predetermined plurality being less than the number of detection intervals in said sequence.

2. The tone detector of claim 1 further comprising:
means for providing a second output indication in response to the failure to detect said predetermined frequency signal during each of at least a second predetermined number of said detection intervals within said sequence.

3. A tone detector comprising:
means for defining a sequence of substantially equal detection intervals,
means operable during each said detection interval for detecting an input signal of predetermined frequency, and
means for providing an output indication in response to the failure to detect said predetermined frequency signal during each of at least a predetermined plurality of said detection intervals within said sequence, said predetermined plurality being less than the number of detection intervals in said sequence.

4. A tone detector comprising:
means for defining a first sequence of substantially equal detection intervals;
means operable during each detection interval of said first sequence for detecting an input signal of predetermined frequency;

means for defining a second sequence of substantially equal detection intervals;

means operative during each detection interval of said second sequence for detecting an input signal of said predetermined frequency; and means for providing an output indication in response to the detection of said predetermined frequency signal during a predetermined combination of said detection intervals of said first and second sequences.

5. A tone detector according to claim 4 wherein said detection intervals of said first sequence are of a first length, wherein said detection intervals of said second sequence are of a second length different from said first length, and wherein said output indication means provides said output indication in response to the detection of said predetermined frequency signal during each of at least a first predetermined number of said detection intervals within said first sequence and during each of at least a second predetermined number of said detection intervals within said second sequence.

6. A tone detector according to claim 4 further comprising:

means for providing a failure indication in response to the failure to detect said predetermined frequency signal during a second combination of said detection intervals of said first and second sequences.

7. A tone detector comprising:

means for defining a plurality of different length detection intervals, means for defining a plurality of sequences of detection intervals, each sequence including detection intervals of only one of said different lengths, means operable during each said detection interval for detecting an input signal of predetermined frequency, means for providing a plurality of output signals, each output signal corresponding to only one of said sequences and provided in response to the detection of said predetermined frequency signal during each of at least a predetermined number of said detection intervals within said corresponding sequence, and means for providing a first output indication in response to a first predetermined combination of said plurality of output signals.

8. The tone detector of claim 7 further comprising:

means for providing a second plurality of output signals, each signal of said second plurality corresponding to a respective one of said sequences and being provided in response to the failure to detect said predetermined frequency signal during each of at least a second predetermined number of detection intervals within said corresponding sequence, and means for providing a second output indication in response to a second predetermined combination of said second plurality of output signals.

9. A tone detector comprising:

means for defining a plurality of sequences of different length detection intervals, the detection intervals within each said sequence being of substantially the same length, means operable during each said detection interval for detecting an input signal of predetermined frequency, means for providing a plurality of signals, each signal corresponding to a respective one of said sequences, and being provided in response to the failure to detect said predetermined frequency signal during each of at least a predetermined number of said detection intervals within said corresponding sequence, and means for providing an output indication in response to a predetermined combination of said plurality of signals.

10. A method for detecting the presence of a predetermined frequency in an input signal, the method comprising the steps of:

a. defining a sequence of substantially equal detection intervals, b. comparing said input signal with a reference signal corresponding to said predetermined frequency during each of a determined number of detection intervals of said sequence, c. accepting each said interval in which said input signal includes said predetermined frequency, d. counting the number of said accepted intervals, e. comparing said count of the number of said accepted intervals with a predetermined accepted interval reference count, and f. providing an output signal if said count is at least equal to said accepted interval reference count.

11. A method for detecting the presence of a predetermined frequency in an input signal, the method comprising the steps of:

a. defining a sequence of detection intervals, b. comparing said input signal with a reference signal corresponding to said predetermined frequency during each of a determined number of detection intervals of said sequence, c. accepting each said interval in which said input signal includes said predetermined frequency, d. counting the number of said accepted intervals, e. comparing said count of the number of said accepted intervals with a predetermined accepted interval reference count, f. providing an output signal if said count is at least equal to said accepted interval reference count, g. rejecting each said interval in which said input signal does not include said predetermined input frequency, h. counting the number of said rejected intervals, i. comparing said count of the number of said rejected intervals with a predetermined rejected interval reference count, and j. providing a second output if said count is at least equal to said rejected interval reference count.

12. A method for detecting the presence of a predetermined frequency in an input signal, the method comprising the steps of:

a. defining a sequence of detection intervals, b. comparing said input signal with a reference signal corresponding to said predetermined frequency during each of a determined number of detection intervals of said sequence, c. accepting each said interval in which said input signal includes said predetermined frequency, d. counting the number of said accepted intervals, e. comparing said count of the number of said accepted intervals with a predetermined accepted interval reference count, f. providing an output signal if said count is at least equal to said accepted interval reference count, g. defining a second sequence of detection intervals,
h. comparing said input signal with a second reference signal corresponding to said predetermined frequency during each of a second determined number of detection intervals of said second sequence,
i. accepting each said second sequence interval in which said input signal includes said predetermined frequency,
j. counting the number of said accepted second sequence intervals,
k. comparing said count of the number of said accepted second seqeunce intervals with a second predetermined accepted interval reference count,
l. providing a second output signal if said accepted second sequence interval count is at least equal to said second accepted interval reference count, and
m. providing an accepted output indication responsive to a predetermined combination of said output signals.

13. The method defined by claim 12 further comprising the steps of:
n. rejecting each said interval of each sequence in which said input signal does not include said predetermined frequency
o. counting the number of said rejected intervals independently for each said sequence,
p. comparing each said count of the number of said rejected intervals with a respective predetermined rejected interval reference count, and
q. providing a rejected output indication responsive to a predetermined combination of said rejected interval counts.

* * * * *